(12) United States Patent
Nagamatsu et al.

(10) Patent No.: US 10,084,161 B2
(45) Date of Patent: Sep. 25, 2018

(54) BATTERY AND METHOD OF PRODUCING THE SAME

(75) Inventors: Shigetaka Nagamatsu, Toyota (JP); Takayuki Tanahashi, Toyota (JP); Hiroyuki Tanaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1150 days.

(21) Appl. No.: 12/671,769

(22) PCT Filed: Aug. 12, 2008

(86) PCT No.: PCT/JP2008/064442
§ 371 (c)(1),
(2), (4) Date: Feb. 2, 2010

(87) PCT Pub. No.: WO2009/025199
PCT Pub. Date: Feb. 26, 2009

(65) Prior Publication Data
US 2010/0209750 A1 Aug. 19, 2010

(30) Foreign Application Priority Data
Aug. 23, 2007 (JP) .................. 2007-216678

(51) Int. Cl.
H01M 2/02 (2006.01)
H01M 10/05 (2010.01)
(Continued)

(52) U.S. Cl.
CPC ......... *H01M 2/029* (2013.01); *H01M 2/0262* (2013.01); *H01M 2/0275* (2013.01);
(Continued)

(58) Field of Classification Search
CPC .. H01M 2/029; H01M 2/0277; H01M 2/0262; H01M 2/0275; H01M 10/052; H01M 10/0587
See application file for complete search history.

(56) References Cited

U.S. PATENT DOCUMENTS

| 6,083,640 A | 7/2000 | Lee et al. |
| 2003/0027041 A1 | 2/2003 | Hamada et al. |

(Continued)

FOREIGN PATENT DOCUMENTS

| JP | 08-083595 | * 3/1996 | ............. H01M 2/02 |
| JP | A-8-83595 | 3/1996 | |

(Continued)

OTHER PUBLICATIONS

Dec. 31, 2011 Office Action issued in Chinese Application No. 200880100569.8 (with translation).
(Continued)

*Primary Examiner* — Jonathan Crepeau
*Assistant Examiner* — Angela Martin
(74) *Attorney, Agent, or Firm* — Oliff PLC

(57) ABSTRACT

A battery includes an electrode body having a positive electrode and a negative electrode and also includes an exterior case for receiving the electrode body. An insulation film for isolating the exterior case and the electrode body from each other is placed between an inner wall surface of the exterior case and the electrode body. The insulation film has a bag-like shape in which the electrode body is inserted. The bag-like insulation film has a gap filling section on its surface facing a side surface of the electrode body, and the gap filling section closes a gap between the electrode body and the inner wall surface of the exterior case.

13 Claims, 6 Drawing Sheets

(51) Int. Cl.
H01M 10/052 (2010.01)
H01M 10/0587 (2010.01)

(52) U.S. Cl.
CPC ....... H01M 2/0277 (2013.01); H01M 10/052 (2013.01); H01M 10/0587 (2013.01); *Y02P 70/54* (2015.11); *Y02T 10/7011* (2013.01); *Y10T 29/49108* (2015.01)

(56) References Cited

U.S. PATENT DOCUMENTS

| | | | | |
|---|---|---|---|---|
| 2008/0084188 | A1* | 4/2008 | Shimoyama | H01M 10/4207 320/150 |
| 2010/0190049 | A1* | 7/2010 | Kawase | H01M 2/1077 429/159 |
| 2012/0005882 | A1* | 1/2012 | Shimamura et al. | 29/623.4 |

FOREIGN PATENT DOCUMENTS

| | | | | |
|---|---|---|---|---|
| JP | 2000-048773 | * | 2/2000 | ............ H01M 2/02 |
| JP | A-2000-48773 | | 2/2000 | |
| JP | A-2000-100404 | | 4/2000 | |
| JP | A-2000-188133 | | 7/2000 | |
| JP | 2002-033084 | * | 1/2002 | ............ H01M 2/02 |
| JP | A-2002-33084 | | 1/2002 | |
| JP | A-2003-51335 | | 2/2003 | |
| JP | A-2003-187880 | | 7/2003 | |
| JP | A-2006-120419 | | 5/2006 | |
| JP | 2006-278245 | * | 10/2006 | ............ H01M 10/04 |
| JP | A-2006-278245 | | 10/2006 | |

OTHER PUBLICATIONS

International Search Report dated Dec. 2, 2008 in corresponding International Application No. PCT/JP2008/064442 (with translation).

Apr. 26, 2012 Search Report issued in European Patent Application No. 08828035.9.

\* cited by examiner (A)　　　(B)

(A)  (B)

(A)  (B)

BATTERY AND METHOD OF PRODUCING THE SAME

TECHNICAL FIELD

The present invention relates to a battery and a method of producing the same. More specifically, the present invention relates to a battery structure that is advantageous for installation on a vehicle.

This international application claims priority to Japanese Patent Application No. 2007-216678, which was filed on Aug. 23, 2007, the entire contents of which are incorporated by reference in the present description.

BACKGROUND ART

Lithium ion batteries, nickel-hydrogen batteries, and other secondary batteries have recently gained importance as power sources for installation on vehicles and also as power sources for personal computers and portable terminals. In particular, lithium ion batteries, which have small weight and make it possible to obtain a high energy density, are expected to be advantageously used as high-power electric power sources for installation on vehicles. The batteries of this type are known to have a structure provided with a wound electrode body obtained by laminating a sheet-like positive electrode and a sheet-like negative electrode together with a separator and winding the laminate.

However, in the batteries of this type, the electrode body and an exterior case have to be manufactured separately and the electrode body has to be thereafter accommodated in the exterior case. A metallic package is often used as the exterior case. In this case, the electrode body has to be packaged with an insulation film in order to insulate the metal package and the electrode body from each other. For example, Patent Document 1 discloses an angular sealed battery configured by covering three surfaces, namely, two side surfaces and a lower surface of an electrode assembly coupled body obtained by connecting a plurality of electrode assemblies (a laminated electrode body obtained by laminating alternately a large number of positive electrode sheets and a large number of negative electrode sheets, with a separator being interposed therebetween) with a sheet of a U-like cross-sectional shape (a single layer of polypropylene or polyethylene or a multilayer laminated structure thereof) and inserting and disposing the electrode assembly coupled body together with the sheet of a U-like cross-sectional shape inside an accommodation space of an angular battery case. Patent Document 2 is another document illustrating prior art.
Patent Document 1: Japanese Patent Application Laid-open No. 2003-51335
Patent Document 2: Japanese Patent Application Laid-open No. 2006-120419

DISCLOSURE OF THE INVENTION

However, in the laminated electrode body (typically, a wound electrode body), thickness in the lamination direction can easily become uneven due to a spread in the degree of lamination (winding) or coating thickness of the electrode active material. The resultant problem is that in a battery including such a laminated electrode body, a gap is formed between the laminated electrode body and the angular battery case (that is, an exterior case accommodating the electrode body and an electrolyte inside thereof). Where a gap is present between the electrode body and the exterior case, an undesirable adverse effect can be produced on battery performance (for example, localization or unevenness of the distribution of amount of electricity caused by uneven distribution of electrode active material resulting from unevenness of the electrode body).

Further, when such a battery is used in a vehicle such as an automobile, a large number of batteries are arranged and a battery assembly (also referred to as a battery or battery pack) is configured in a restrained state (that is, a state in which individual batteries are fixed to each other) because of space restrictions and an assumed usage in a state in which vibrations occur. When the batteries are thus restrained, a corresponding load is applied to each battery (unit battery=cell) constituting the battery pack. Where a gap is present between the electrode body and the exterior case, the exterior case can be bent or deformed in the loading direction by the corresponding load that is applied when the batteries are restrained.

The present invention has been developed to resolve the above-described problems relating to the conventional batteries, and it is an object of the present invention to provide a battery (for example, a unit battery constituting a battery pack) in which no gap appears inside the exterior case. Another object of the present invention is to provide a method of producing such a battery with good productivity.

The battery provided in accordance with the present invention includes an electrode body having a positive electrode and a negative electrode, and an exterior case that accommodates the electrode body. An insulation film that separates the exterior case and the electrode body is disposed between an inner wall surface of the exterior case and the electrode body. The insulation film is formed in a bag-like shape into which the electrode body is inserted. The bag-like insulation film is characterized in that a gap filling section that closes a gap between the electrode body and the inner wall surface of the exterior case is provided at a surface of the insulation film that faces a side surface of the electrode body.

With the battery of such a configuration, the gap inside the exterior case, typically the gap caused by shape unevenness of the electrode body that is accommodated inside the exterior case, can be closed by the gap filling section provided in the bag-like insulation film. As a result, the adverse effect produced by the presence of the gap on the battery performance (for example, localization or unevenness of the distribution of amount of electricity caused by uneven distribution of electrode active material resulting from unevenness of the electrode body) can be effectively prevented. Further, by using the gap filling section that is integrated with the bag-like insulation film, it is possible to prevent the displacement that can occur in a case where a member for gap filling is separately loaded into the exterior case and to close reliably the gap between the electrode body and the exterior case (inner wall surface).

Further, the battery in accordance with the present invention can be especially advantageously used as a power source for a motor (electric motor) installed on a vehicle such as an automobile. Thus, the batteries in accordance with the present invention can be arranged as unit batteries in the predetermined direction, a battery pack can be configured by restraining the unit batteries in the arrangement direction, and the battery pack can be advantageously used as a power source for installation on a vehicle.

In this case, because the gap inside the exterior case of each battery constituting the battery pack is closed by the gap filling section provided at the bag-like insulation film, the outer shape of the battery can be prevented from distortion (deformation of the exterior case) by a corresponding load applied during the aforementioned restraining. Therefore, with the battery in accordance with the present invention, it is possible to provide a highly reliably battery pack for installation on a vehicle and for other applications.

According to the preferred aspect of the battery disclosed herein, the gap filling section is configured by joining one or a plurality of sheet-like gap filling members formed in a sheet-like form and having a predetermined thickness, to a surface of the bag-like insulation film that faces the side surface of the electrode body.

The size of the gap between the electrode body and the exterior case (inner wall surface) differs among individual batteries, but with the above-described configuration, the gap in each battery can be closed by preparing the sheet-like gap filling member of a predetermined thickness and joining it to the bag-like insulation film and adjusting the number of the gap filling members used, without preparing a large number of gap filling members of different sizes.

According to the preferred aspect of the battery disclosed herein, the electrode body is a flat-shaped wound electrode body obtained by winding a sheet-like positive electrode and a sheet-like negative electrode. The gap filling section is formed in a position facing a flat surface of the wound electrode body.

The thickness of the wound electrode body can easily be uneven due to the structure of the electrode body, but in accordance with the present aspect of the invention, a gap caused by the uneven shape of the wound electrode body can be reliably closed.

Further, the present invention also provides a method of advantageously producing the battery disclosed herein. Thus, one aspect of the method of producing the battery disclosed herein relates to a method of producing a battery provided with an electrode body (typically, a flat-shaped electrode body) having a positive electrode and a negative electrode, and an exterior case that accommodates the electrode body. The production method in accordance with the present invention includes a step (a) of inserting the electrode body into an insulation film formed in a bag-like shape; and a step (b) of accommodating the electrode body together with the bag-like insulation film in the exterior case. The insulation film is provided with a gap filling section that closes a gap between the electrode body and an inner wall surface of the exterior case, at a surface of the insulation film that faces a side surface of the electrode body, and when the electrode body is accommodated together with the bag-like insulation film in the exterior case in the step (b), the gap between the electrode body and the inner wall surface of the exterior case is closed by the gap filling section.

With the production method in accordance with the present invention, the gap between the electrode body and the inner wall surface of the exterior case can be closed by accommodating the bag-like insulation film provided with the gap filling section together with the electrode body in the exterior case. Thus, the operation of closing the gap (gap filling operation) can be performed merely by accommodating the electrode body together with the bag-like insulation film inside the exterior case and operability in this case is good. Further, positioning of the gap filling section and electrode body can be performed easily and reliably when the electrode body is inserted into the bag-like insulation film and the accuracy of such positioning is high.

According to the preferred aspect of the method of producing the battery disclosed herein, the gap filling section is configured by joining one or a plurality of sheet-like gap filling members formed in a sheet-like form and having a predetermined thickness, to a surface of the bag-like insulation film that faces the side surface of the electrode body.

The size of the gap between the electrode body and the exterior case (inner wall surface) differs among individual batteries, but with the above-described production method, the gap in each battery can be closed by preparing the sheet-like gap filling member of a predetermined thickness and joining it to the bag-like insulation film and adjusting the number of the gap filling members used, without preparing a large number of gap filling members of different sizes. Therefore, the gap filling processing can be performed with good efficiency.

In this case, it is preferred that the sheet-like gap filling member be spot fused to a peripheral portion of the bag-like insulation film on a bag opening side into which the electrode body is inserted. With such a configuration, when the electrode body is inserted into the bag-like insulation film, the sheet-like gap filling member can be prevented from being dragged and displaced by the sheet-like gap filling member. Further, the occurrence of wrinkles or twisting in the bag-like insulation film due to dragging by the electrode body can be avoided.

According to the preferred aspect of the method of producing the battery disclosed herein, a plurality of the sheet-like gap filling members are joined to a surface of the bag-like insulation film that faces the side surface of the electrode body. In this case, the plurality of the sheet-like gap filling members are fused together and integrated in advance before being joined to the bag-like insulation film.

The integration of the plurality of sheet-like gap filling members facilitates the operations of conveying and fusing the gap filling members to the bag-like insulation film.

BEST MODE FOR CARRYING OUT THE INVENTION

Figure 1:
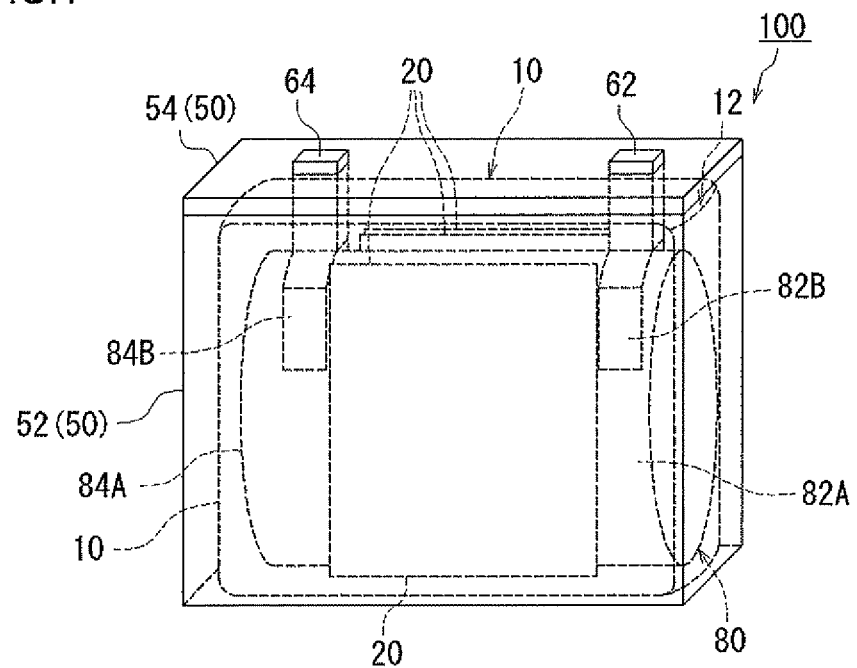
FIG. 1 is an external perspective view illustrating schematically the configuration of the battery according to one embodiment of the present invention.

The embodiments of the present invention will be described below with reference to the appended drawings. In the drawings below, components or members producing the same action are assigned with same reference numerals. The structure of the battery in accordance with the present invention will be explained in detail hereinbelow based on an example of an angular lithium ion secondary battery 100, but the present embodiment should not be construed as being limited to the configuration described in the embodiments. The dimensional relationship (length, width, thickness, etc.) in the drawings does not reflect the actual dimensional relationship.

The configuration of the battery 100 will be described below with reference to FIG. 1. FIG. 1 is an external perspective view illustrating schematically the configuration of a lithium ion secondary battery according to the present embodiment. As shown in FIG. 1 as an example, the lithium ion secondary battery 100 disclosed herein is provided with an electrode body 80 including a positive electrode and a negative electrode and a exterior case 50 that accommodates the electrode body 80.

The exterior case 50 of the present embodiment is constituted by an exterior case body 52 and a lid 54. The exterior case body 52 has a shape (in this example, a box-like shape) that can accommodate the below-described flat-shaped electrode body 80. The exterior case body 52 has an open end at the top and can accommodate the electrode body 80 via the open end. The lid 54 is a plate-shaped member that closes the upper end opening of the exterior case body 52. In this case, the lid has an almost rectangular shape. The material of the exterior case 50 (the exterior case body 52 and lid 54) is preferably a lightweight metal material that has good thermal conductivity. Examples of such metal materials include aluminum, stainless steel, and nickel-plated steel.

A insulation film 10 that separates the exterior case 50 and the electrode body 80 is disposed between the exterior case 50 and the electrode body 80. The insulation film 10 makes it possible to avoid the direct contact of the electrode body 80, which is a power generating element, and the exterior case 50 and ensure insulation of the electrode body 80 and the exterior case 50. The insulation film may be constituted by a material that can function as an insulating material. For example, a resin material such as polypropylene or polyethylene can be advantageously used. The insulation film 10 is formed in a bag-like shape that can surround the electrode body 80 (the electrode body 80 can be inserted thereinto). The insulation film 10 of the present embodiment is in the form of a bottomed bag that has an opening at the upper end side as shown in FIG. 1 (that is, a bag that surrounds the bottom surface and four side surfaces of the electrode body 80), and the electrode body 80 is accommodated inside the insulation film via the bag opening 12.

Figure 2:
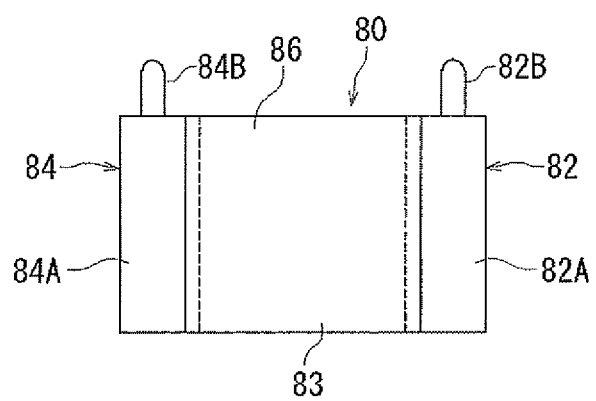
FIG. 2 is a front view illustrating schematically an example of a wound electrode body.

The electrode body 80 of the present embodiment will be explained below with additional reference to FIG. 2. FIG. 2 is a front view illustrating schematically an example of the electrode body 80. The electrode body 80 of the present embodiment is constituted by a predetermined battery materials (active materials of the positive electrode and negative electrode, collectors of the positive electrode and negative electrode, separator, and the like), like a typical battery. In this case, a flat-shaped wound electrode body 80 is used as the electrode body 80. As shown in FIG. 2, the wound electrode body 80 is obtained, similarly to the wound electrode body of the usual lithium ion battery, by laminating a sheet-like positive electrode 82 (referred to hereinbelow as "positive electrode sheet 82") and a sheet-like negative electrode 84 (referred to hereinbelow as "negative electrode sheet 84") together with a total of two sheet-like separators 86 (referred to hereinbelow as "separator sheet 86"), then winding the positive electrode sheet 82 and negative electrode sheet 84 with a certain displacement and then applying a pressure to the obtained wound body, and collapsing the wound body. As a result, a flat-shaped wound electrode body 80 is fabricated. The thickness of the wound electrode body can easily become uneven depending on the degree or state of winding. It means that the size of the gap inside the exterior case of the battery 100 (that is, the difference between the thickness of the wound electrode body in the lamination direction and the thickness of the hollow portion inside the exterior case along this direction) varies correspondingly to the wound electrode body used.

Figure 3:
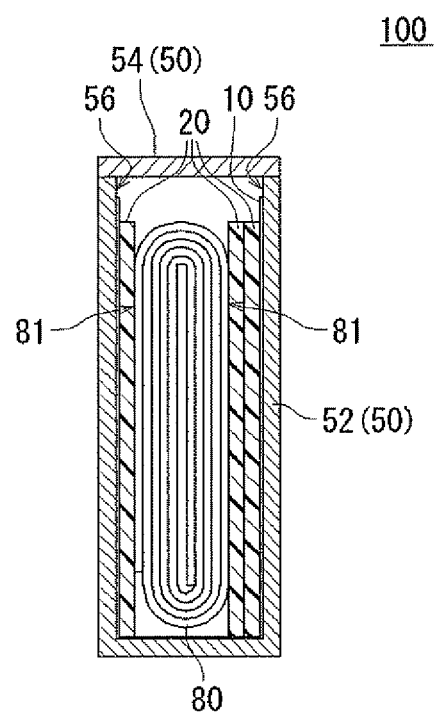
FIG. 3 is a cross-sectional view illustrating schematically a state inside the exterior case of the battery shown in FIG. 1.

For example, FIG. 3 is a cross-sectional view illustrating schematically the state inside the exterior case in which the wound electrode body 80 and the exterior case 50 are disposed via a gap. As shown in FIG. 3, a gap is formed between the flat surface (side surface) 81 of the wound electrode body 80 and an inner wall surface 56 (in this case, the bag-like insulation film 10 surrounding the electrode body) of the exterior case body 52. In the present embodiment, the gap of the exterior case 50 of the battery 100 can be closed by a gap filling section 20 provided in the bag-like insulation film 20. The gap filling section 20 corresponds to a thick portion formed at the surface facing the side surface of the electrode body 80. The gap filling section 20 of the present embodiment is formed in the position facing a flat surface 81 of the wound electrode body 80, and this portion is so configured that the thickness thereof matches the size of the gap between the wound electrode body 80 (flat surface 81) and the exterior case body 52 (inner wall surface 56).

With the battery 100 of such a configuration, the gap inside the exterior case 50, typically the gap caused by the uneven shape of the electrode body 80 accommodated inside the exterior case, can be closed by the gap filling section 20 provided at the bag-like insulation film 10. As a result, the adverse effect produced by the presence of the gap on the battery performance (for example, localization or unevenness of the distribution of amount of electricity caused by uneven distribution of electrode active material resulting from unevenness of the electrode body) can be effectively prevented. Further, because the gap filling section 20 that closes the gap is integrated with the bag-like insulation film 10, it is possible to prevent the displacement of the gap filling section 20 and close reliably the gap.

Figure 4:
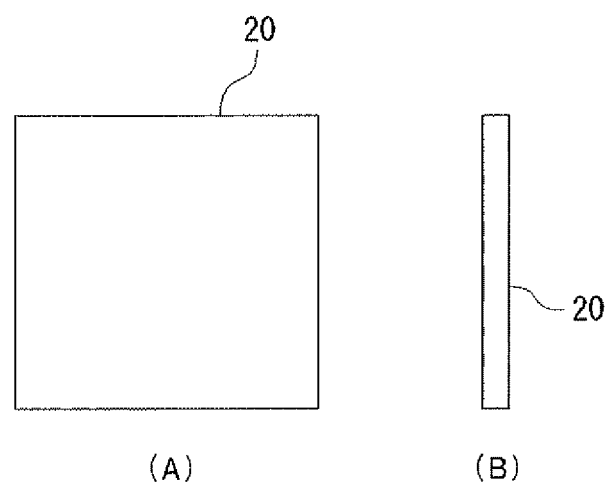
FIG. 4 illustrates schematically an example of a sheet-like gap filling material.

Specific features of the gap filling section 20 according to the present embodiment will be described below in greater detail. The gap filling section 20 provided at the bag-like insulation film 10 is configured by joining one or a plurality of sheet-like gap filling members 20 that are formed to a sheet-like shape having a predetermined thickness (referred to hereinbelow as "gap filling sheet") to the surface of the bag-like insulation film 10 that faces a side surface (in this case, a flat surface 81) of the electrode body 80. The sheet-like gap filling member 20 is in the form of a thin sheet such as shown in FIG. 4 ((A) in FIG. 4 is a front view, and (B) in FIG. 4 is a side view). Thus the gap filling sheet 20 composed of a polyolefin resin such as polypropylene and having a thickness of equal to or less than 1 mm (typically 10 to 1000 μm, preferably 100 to 200 μm) can be advantageously used.

Thus, as shown in FIG. 3, the adequate number of the gap filling sheets 20 are prepared correspondingly to the size of the gap inside the exterior case 50 and the prepared gap filling sheets are joined to the bag-like insulation film 10 (surface facing the flat surface 81 of the wound electrode body 80), thereby closing the gap inside the exterior case 50 of the battery 100. In the configuration shown in FIG. 3, two gap filling sheets 20 are used on the right side of the electrode body 80, one gap filling sheet 20 is used on the left side, and the gap filling sheets are joined to respective opposite surfaces of the bag-like insulation film 10 (flat surface 81). The joining means is, for example, spot fusion. Various fusion (bonding) methods that can be applied to a typical battery may be used instead of spot fusion.

Since the size of the gap between the electrode body 80 and the exterior case 50 (inner wall surface 56) differs between individual batteries, in the above-described configuration, the gap in each battery can be closed by preparing the gap filling sheets 20 of a predetermined thickness, joining them to the bag-like insulation film 10, and adjusting the number of sheets used, without preparing a large number of gap filling members of different sizes. Thus, gaps of various sizes inside the exterior case 50 can be efficiently filled (closed) by using the gap filling sheets 20 of the same shape.

A method of producing the battery 100 (in particular a method for constituting the bag-like insulation film provided with a gap filling section (gap filling sheet)) will be explained below with reference to FIGS. 5 to 9C, while describing the constituent materials that constitute the battery 100 of the present embodiment.

Figure 5:
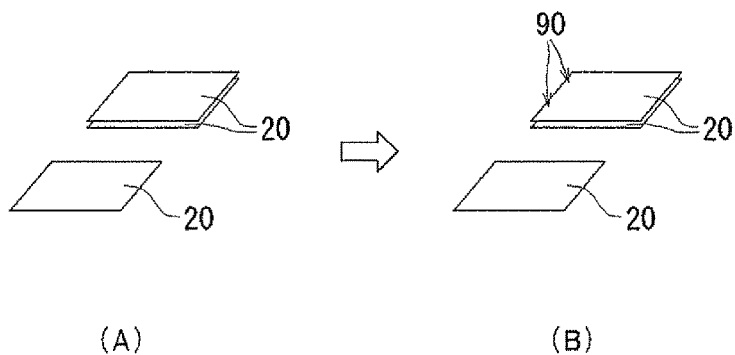
FIG. 5 illustrates a process of fusing a gap filling sheet.

First, a method for constituting the bag-like insulation film 10 provided with the gap filling member (gap filling sheet 20) will be explained with reference to FIGS. 5 to 7. As shown in (A) in FIG. 5, the adequate number of the gap filling sheets 20 are prepared correspondingly to the size of the gap inside the exterior case 50 (gap between the inner wall surface of the exterior case and the flat surface of the electrode body). In this case, an example is considered in which three gap filling sheets 20 are prepared correspondingly to the size of the gap inside the exterior case 50. The three gap filling sheets 20 are separately laminated in two sets: one sheet on the front side of the paper surface and two sheets on the deep side of the paper surface. All three sheets may be also laminated on either of the front side of the paper surface and the deep side of the paper surface, without separation into two sets. The plurality of the gap filling sheets 20 are fused together and integrated in advance prior to joining to the bag-like insulation film 10. Thus, as shown in (B) of FIG. 5, the two gap filling sheets 20 that have been laminated on the deep side of the paper surface are pre-fused (bonded) together. The location of such fusion (bonding) may be such that is not restrained during assembling in the below-described battery pack (location in which no load is received during restraining). In this example, two zones (see arrows "90") of the peripheral portions of the mutually opposing surfaces are spot fused. Such a pre-fusion integrates the two gap filling sheets to a degree that prevents them from separating and facilitates the operations of conveying and fusing (bonding) to an insulation film 15 shown in FIG. 6.

Figure 6:
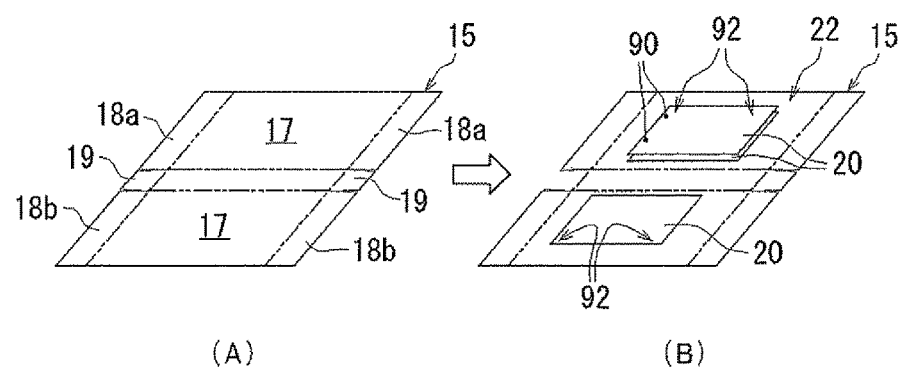
FIG. 6 illustrates a process of fusing a gap filling sheet to the sheet-like insulation film.

Then, the sheet-like insulation film 15 is prepared as shown in (A) in FIG. 6. The bag-like insulation film 10 has an elongated (band-like) sheet structure at a stage before it is assembled in a bag. Thus, the configuration is such that where the bag-like insulation film 10 is spread, one sheet shown in (A) of FIG. 6 is obtained.

As shown in (B) in FIG. 6, the gap filling sheets 20 are conveyed onto the sheet-like insulation film 15. In this case, the gap filling sheets 20 are placed on a sheet surface 17 (that is, the surface of the bag-like insulation film that faces the side surface of the electrode body) that will be positioned opposite the flat surface 81 of the electrode body 80 when the bag is formed. In this state, the gap filling sheets 20 and the sheet-like insulation film 15 are fused (bonded) together. In this case, it is preferred that the gap filling sheets 20 be fused at the peripheral portion on the bag opening side of the bag-like insulation film into which the electrode body will be inserted. In this example, the gap filling sheets 20 are spot fused in two locations (see arrows "92") of the peripheral portion of a sheet surface 17 corresponding to the peripheral portion of the bag-like insulation film at the bag opening side. With such a configuration, when the electrode body 80 is inserted into the bag-like insulation film 10 (see FIGS. 8A to 8C), the gap filling sheets 20 can be prevented from being dragged and displaced by the electrode body 80. Further, the occurrence of wrinkles and twisting in the bag-like insulation film 10 caused by dragging by the electrode body 80 can be avoided. It is even more preferred that the spot fusion location of the gap filling sheets 20 and the sheet surface 17 be in a zone that is not restrained when the below-described battery pack is assembled (zone where no load is received during restraining).

Figure 7:
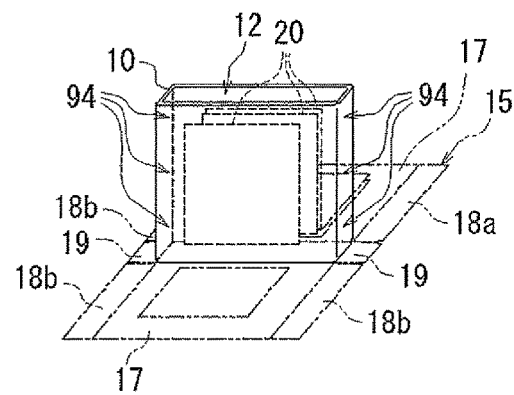
FIG. 7 illustrates a process of bending the sheet-like insulation film into a bag-like shape.

Then, as shown in FIG. 7, the sheet-like insulation film 15 is bent to obtain a bag-like shape. In the example shown in the figure, the sheet surfaces 17, 18a, 18b, and 19 constituting the sheet-like insulation film. 15 are bent inward along the two-dot-dash lines to obtain a bag-like shape, and the surfaces 18a and 18b are then overlapped and fused together to form the bag-like insulation film 10. Three zones (upper end portion, central portion, and lower end portion shown by arrows "94") are spot fused in a state in which the surfaces 18a and 18b are brought into surface contact with each other. By spot fusing the three zones, namely, the two end portions and the central portion, of the surfaces 18a and 18b that have been brought into surface contact with each other, it is possible to obtain the appropriate joint strength with a minimum necessary number of fusion spots, and wrinkling and twisting cannot occur when the electrode body 80 is inserted into the bag-like insulation film 10 (see FIGS. 8A to 8C). The bag-like insulation film 10 provided with the gap filling sheets 20 in the predetermined position (position that can face the flat surface of the electrode body 80) can be easily fabricated. The electrode body 80 is inserted into the bag-like insulation film 10.

A process of preparing the electrode body 80 will be described below. The electrode body 80 of the present embodiment is a flat-shaped wound electrode body 80 such as described above.

In the wound electrode body 80, because winding has been conducted with a certain displacement in the transverse direction with respect to the winding direction, as shown in FIG. 2, portions of the ends of the positive electrode sheet 82 and negative electrode sheet 84 protrude outward from the winding core portion 83 (that is, a portion where the positive electrode active material layer formation portion of the positive electrode sheet 82, a negative electrode active material layer formation portion of the negative electrode sheet 84, and separator sheet 86 are tightly wound). A positive electrode lead terminal 82B and a negative electrode lead terminal 8413 are attached to a protruding portion 82A at the positive electrode side (that is, a portion where the positive electrode active material layer is not formed) and the protruding portion 84A at the negative electrode side (that is, portion where the negative electrode active material layer is not formed), respectively, and electrically connected to a positive electrode terminal 62 (FIG. 1) and a negative electrode terminal 64 (FIG. 1) provided at the lid 54 of the exterior case 50.

The gap filling sheets 20 are preferably so joined to the bag-like insulation film that a mutual arrangement is obtained such that the gap filling sheets can be opposite the wound core portion 83. This is because the thickness of the wound core portion 83 can easily become uneven because of spread in coating film thickness of the electrode active material and a gap with the inner wall surface of the exterior case can easily appear in this portion. The electrode body 80 of the present embodiment has been assembled in advance with the lid 54 of the exterior case 50, with the positive electrode terminal 62 and negative electrode terminal 64 being interposed therebetween, at a stage prior to accommodation of the electrode body in the exterior case body 52 (see FIG. 8B).

Materials and members that constitute the wound electrode body 80 are not particularly limited, and materials and members similar to those of the electrode body of the conventional lithium ion battery can be used. For example, the positive electrode sheet 82 can be formed by applying a positive electrode active material layer for a lithium ion battery to an elongated positive electrode collector. A metal foil suitable for a positive electrode, such as an aluminum foil (present embodiment) can be advantageously used as the positive electrode collector. A substance that has been used in the conventional lithium ion batteries or a combination or two or more of such substances can be used without particular limitations for the positive electrode active material. Examples of advantageous compounds include $LiMn_2O_4$, $LiCoO_2$, and $LiNiO_2$.

The negative electrode sheet 84 can be formed by applying a negative electrode active material layer for a lithium ion battery to an elongated negative electrode collector. A metal foil suitable for a negative electrode, such as a copper foil (present embodiment) can be advantageously used as the negative electrode collector. A substance that has been used in the conventional lithium ion batteries or a combination or two or more such substances can be used without particular limitations for the negative electrode active material. Examples of advantageous compounds include carbonaceous materials such as graphite carbon and amorphous carbon, lithium-containing transition metal oxide, and transition metal nitrides.

A sheet constituted by a porous polyolefin resin can be used as the preferred separator sheet 86 that is used between the positive and negative electrode sheets 82 and 84. For example, a synthetic resin (for example, a polyolefin such as polyethylene) porous separator sheet with a length of 2 to 4 m (for example, 3.1 m), a width of 8 to 12 cm (for example, 11 cm), and a thickness of about 5 to 30 µm (for example, 25 µm) can be advantageously used. In a case where a solid electrolyte or a gelled electrolyte is used as the electrolyte, the separator is sometimes unnecessary (that is, in this case the electrolyte itself can function as a separator).

The electrode body that is accommodated in the exterior case of the battery is not limited to a wound-type electrode body. For example, a laminated electrode body in which positive electrode sheets and negative electrode sheets are laminated alternately together with a separator (or a solid or gelled electrolyte that can function as the separator) may be also used.

Figure 8A:
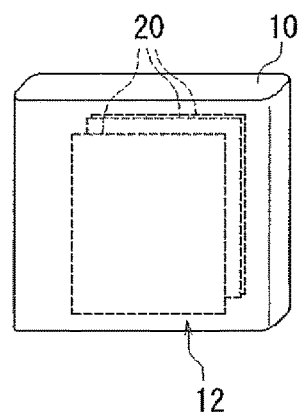
FIG. 8A illustrates a process of inserting the electrode body into the bag-like insulation film.
Figure 8B:
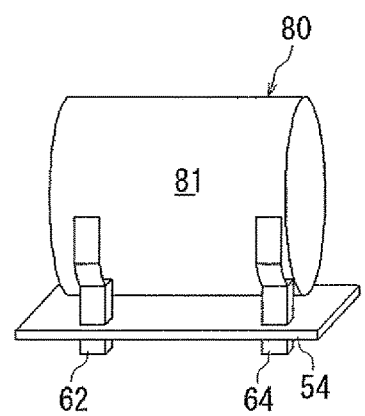
FIG. 8B illustrates a process of inserting the electrode body into the bag-like insulation film.
Figure 8C:
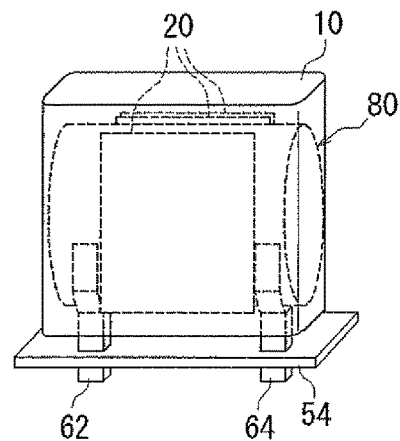
FIG. 8C illustrates a process of inserting the electrode body into the bag-like insulation film.

A process of accommodating the electrode body 80 in the exterior case 50 will be explained below with reference to FIGS. 8A to C and FIGS. 9A to C. First, as shown in FIGS. 8A to 8C, the electrode body 80 is inserted into the bag-like insulation film 10. More specifically, as shown in FIG. 8A, the bag-like insulation film 10 is prepared so that the bag opening 12 faces town. Then, as shown in FIG. 8B, the wound electrode body 80 and bag-like insulation film 10 are aligned and then the wound electrode body 80 is inserted so as to be covered by the bag-like insulation film 10, as shown in FIG. 8C. In this case, because the gap filling sheets 20 have been fused in advance to the surface of the bag-like insulation film 10 that faces the side surface (flat surface 81) of the electrode body 80, the gap filling sheet 20 and side surface (flat surface 81) of the electrode body 80 can be easily and reliably aligned by the insertion process.

Figure 9A:
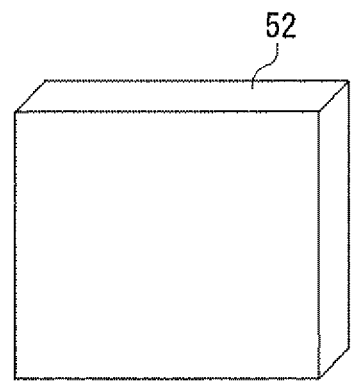
FIG. 9A illustrates a process of accommodating the electrode body in the exterior case.
Figure 9B:
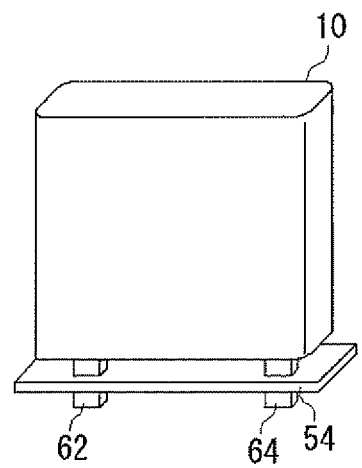
FIG. 9B illustrates a process of accommodating the electrode body in the exterior case.
Figure 9C:
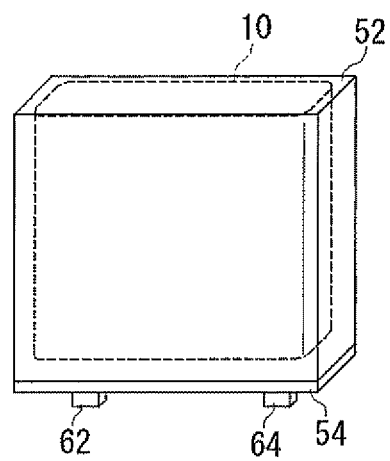
FIG. 9C illustrates a process of accommodating the electrode body in the exterior case.

After the electrode body 80 has thus been inserted into the bag-like insulation film 10, the electrode body 80 is accommodated together with the bag-like insulation film 10 in the exterior case body 52, as shown in FIGS. 9A to C. More specifically, as shown in FIG. 9A, the exterior case body 52 is prepared so that the opening faces down. Then, the wound electrode body 80 inserted into the bag-like insulation film 10 is prepared so that the lid 54 is on the lower side, as shown in FIG. 9B, and the electrode body 80 and the bag-like insulation film 10 are covered from above with the exterior case body 52, as shown in FIG. 9C. In this case, the gap between the electrode body 80 and the inner wall surface of the exterior case body 52 can be closed by the gap filling section (gap filling sheets 20) that is accommodated together with the bag-like insulation film 10. According to the present embodiment, the operation of closing the gap (gap filling operation) can be performed by accommodating the bag-like insulation film together with the electrode body inside the exterior case and the operability is good. The exterior case body 52 and the lid 54 are then joined (typically welded together), an electrolytic solution is poured in through a pouring port (not shown in the figure) provided in the lid body 54, and the poring port is then sealed to construct the battery 100.

In the present embodiment, a nonaqueous electrolytic solution is poured that is obtained by dissolving an electrolyte in an a nonaqueous solvent. For example, one, or two or more compounds selected form the group including ethylene carbonate, propylene carbonate, dimethyl carbonate (DMC), diethyl carbonate, ethyl methyl carbonate (EMC), 1,2-dimethoxyethane, 1,2-diethoxyethane, tetrahydrofuran, and 1,3-dioxolane can be used as the nonaqueous solvent constituting the electrolytic solution. In the battery of the present embodiment, a mixed solvent of diethyl carbonate and ethylene carbonate is used (for example, at a mass ratio of 1:1). Further, one, or two or more compounds selected from lithium salts having fluorine as a constituent element can be used as the electrolyte (support salt) constituting the electrolytic solution. For example, one, or two or more compounds selected form the group including $LiPF_6$, $LiBF_4$, $LiAsF_6$, $LiCF_3SO_3$, $LiC_4F_9SO_3$, $LiN(CF_3SO_2)_2$, $LiC(CF_3SO_2)_3$ can be used.

With the production method of the present embodiment, the gap between the electrode body 80 and the inner wall surface of the exterior case body 52 can be easily closed (good operability) by accommodating the bag-like insulation film 10 provided with the gap filling section (gap filling sheets) 20 together with the electrode body 80 inside the exterior case 50. Further, when the electrode body 80 is inserted into the bag-like insulation film 10, gap filling section (gap filling sheets) 20 and the electrode body 80 can be easily and reliably aligned, and the alignment accuracy is good. Further, because the gap filling sheets 20 are spot fused to the peripheral portion of the bag-like insulation film 10 at the bag opening 12 side into which the electrode body 80 is inserted, the gap filling sheets 20 can be prevented from being dragged by the electrode body 80 and displaced when the electrode body 80 is inserted and the occurrence of wrinkles and twisting of the bag-like insulation film 10 due to dragging caused by the electrode body 80 can be avoided. Because a plurality of gap filling sheets 20 are fused together and integrated before being joined to the bag-like insulation film 10, the sheets can be easily conveyed and fused to the insulation film.

Figure 10:
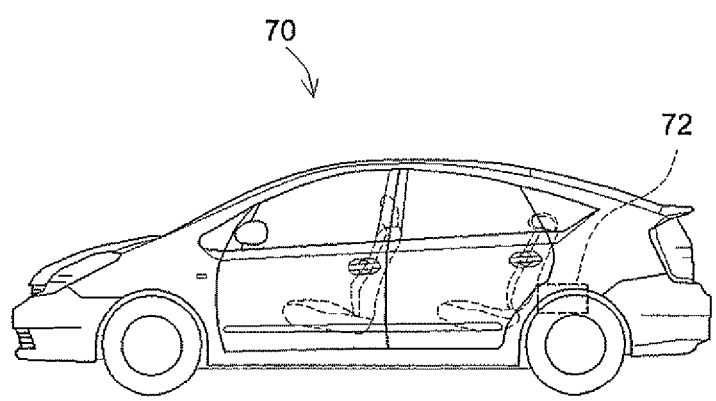
FIG. 10 is a side view illustrating schematically a vehicle (automobile) provided with the battery according to an embodiment of the present invention.

Further, as shown in FIG. 10, the battery 100 produced in the above-described manner can be advantageously used as a power source for installation on a vehicle 70 (typically, an electric automobile, in particular an automobile equipped with an electric motor such as a hybrid automobile, electric automobile, and fuel cell automobile). When the battery 100 is used as a power source for installation on an automobile, a large number of batteries 100 are arranged and a battery pack 72 is configured in a restrained state (that is, a state in which individual batteries are fixed to each other) because of space restrictions and an assumed usage in a state in which vibrations occur. When the batteries are thus restrained, a corresponding load is applied to each battery (unit battery) 100 constituting the battery pack 72. In the present embodiment, because the gap inside the exterior case 50 is closed with the gap filling sheets 20, the exterior of the battery can be prevented from being deformed (deformation of the outer case) by this corresponding load.

The present invention is explained above based on the preferred embodiments thereof, but this description is not limiting and it goes without saying that various modifications can be made. For example, in the above-described embodiments, the gap filling section is formed by joining one or a plurality of sheet-like gap filling members to the inner surface of the insulation film (bag-like film after molding), but such a configuration is not limiting. For example, a portion of the insulation film that forms the gap filling section can have a double film structure that can be tightly closed (sealed), and the gap filling section may be formed by loading and sealing a gap filling member (sheet-like, gel-like, or fine powder-like filler) of various shapes between the films of the double film structure.

INDUSTRIAL APPLICABILITY

The present invention can provide a battery in which a gap that can appear inside the exterior case can be closed. The battery in accordance with the present invention is especially suitable as a power source for a motor (electric motor) that is installed on a vehicle such as an automobile. Thus, a battery pack can be constructed by arranging the batteries in accordance with the present invention as unit batteries (cells) in a predetermined direction (typically the batteries are connected in serial) and restraining the bundle of the unit batteries in the arrangement direction. Such a battery pack can be advantageously used as a power source for installation on a vehicle.

The invention claimed is:

1. A battery comprising an electrode body having a positive electrode and a negative electrode, and an exterior case that accommodates the electrode body, wherein
    an insulation film that separates the exterior case and the electrode body is disposed between an inner wall surface of the exterior case and the electrode body;
    the insulation film is formed in a bag-shape into which the electrode body is inserted;
    one or a plurality of sheet-shaped gap filling members formed in a sheet-shape form and closing a gap between the electrode body and the inner wall surface of the exterior case are joined to a surface of the bag-shaped insulation film that faces a side surface of the electrode body;
    the electrode body is a flat-shaped wound electrode body obtained by winding a sheet-shaped positive electrode and a sheet-shaped negative electrode, and
    the sheet-shaped gap filling member is disposed in a position facing a flat surface of the wound electrode body.

2. The battery according to claim 1, wherein the sheet-shaped gap filling member is spot fused to a peripheral portion of the bag-shaped insulation film on a bag opening side into which the electrode body is inserted.

3. The battery according to claim 1, that is used as a unit battery for constituting a battery pack configured by arranging a plurality of unit batteries in a predetermined direction and restraining the unit batteries in the arrangement direction, wherein
    the sheet-shaped gap filling member and the bag-shaped insulating film are joined by spot fusion, and
    the spot fusion location is a location in which no load is received during restraining in the arrangement direction.

4. A method of producing a battery provided with an electrode body having a positive electrode and a negative electrode, and an exterior case that accommodates the electrode body, comprising:
    a step (a) of inserting the electrode body into an insulation film formed in a bag-shape; and
    a step (b) of accommodating the electrode body together with the bag-shaped insulation film in the exterior case, wherein
    one or a plurality of sheet-shaped gap filling members formed in a sheet-shape form are joined in advance to a surface of the bag-shaped insulation film that faces a side surface of the electrode body before the step (a),
    when the electrode body is accommodated together with the bag-shaped insulation film in the exterior case in the step (b), the gap between the electrode body and an inner wall surface of the exterior case is closed by the one or a plurality of sheet-shaped gap filling members,
    the electrode body is a flat-shaped wound electrode body obtained by winding a sheet-shaped positive electrode and a sheet-shaped negative electrode, and
    the sheet-shaped gap filling member is disposed in a position facing a flat surface of the wound electrode body.

5. The production method according to claim 4, wherein the sheet-shaped gap filling member is spot fused to a peripheral portion of the bag-shaped insulation film on a bag opening side into which the electrode body is inserted.

6. The production method according to claim 4, wherein a plurality of sheet-shaped gap filling members formed in a sheet-shape are joined to a surface of the bag-shaped insulation film that faces the side surface of the electrode body before the step (a), and
    the plurality of the sheet-shaped gap filling members are fused together and integrated in advance before being joined to the bag-shaped insulation film.

7. A vehicle, comprising the battery described in claim 1.

8. The battery according to claim 1, wherein a side of the one or the plurality of sheet-shaped gap filling members contacts a surface of the bag-shaped insulation film, and an opposite side of the one or the plurality of sheet-shaped gap filling members contacts a flat surface of the wound electrode body.

9. The production method according to claim 4, wherein a side of the one or the plurality of sheet-shaped gap filling members contacts a surface of the bag-shaped insulation film, and an opposite side of the one or the plurality of sheet-shaped gap filling members contacts a flat surface of the wound electrode body.

10. The battery according to claim 1, wherein the one or the plurality of sheet-shaped gap filling members are fused to the surface of the bag-shaped insulation film that faces the side surface of the electrode body by fusion.

11. The production method according to claim 4, wherein the one or the plurality of sheet-shaped gap filling members formed in a sheet-shape form are fused in advance to a surface of the bag-shaped insulation film that faces a side surface of the electrode body before the step (a).

12. The battery according to claim 1, wherein the one or the plurality of sheet-shaped gap filling members directly contact the surface of the bag-shaped insulation film that faces the side surface of the electrode body by fusion.

13. The production method according to claim 4, wherein the one or the plurality of sheet-shaped gap filling members formed in a sheet-shape form directly contact a surface of the bag-shaped insulation film that faces a side surface of the electrode body after the step (a).

* * * * *